US012639961B2

(12) United States Patent
Sano et al.

(10) Patent No.: US 12,639,961 B2
(45) Date of Patent: May 26, 2026

(54) CARELESS DRIVING DETERMINATION APPARATUS AND CARELESS DRIVING DETERMINATION METHOD

(71) Applicants:TOYOTA JIDOSHA KABUSHIKI KAISHA, Toyota (JP); AISIN CORPORATION, Kariya (JP)

(72) Inventors: Masataka Sano, Tokyo-to (JP); Koichiro Yamauchi, Tokyo-to (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 361 days.

(21) Appl. No.: 18/222,214

(22) Filed: Jul. 14, 2023

(65) Prior Publication Data

US 2024/0029453 A1     Jan. 25, 2024

(30) Foreign Application Priority Data

Jul. 20, 2022     (JP) ................................. 2022-115844

(51) Int. Cl.
*G06V 20/59*          (2022.01)
*G06V 40/16*          (2022.01)
(52) U.S. Cl.
CPC .......... *G06V 20/597* (2022.01); *G06V 40/161* (2022.01)
(58) Field of Classification Search
CPC .. G06V 20/597; G06V 40/161; G06V 40/166; G06V 40/172; B60W 40/08; B60W 2040/0818; B60R 1/29
USPC ....................................................... 382/100
See application file for complete search history.

(56) References Cited

U.S. PATENT DOCUMENTS

| | | | | |
|---|---|---|---|---|
| 2011/0052013 | A1* | 3/2011 | Sasahara .............. | G06V 40/165 382/118 |
| 2019/0147267 | A1* | 5/2019 | Aizawa ................. | B60W 50/00 340/576 |
| 2019/0188452 | A1* | 6/2019 | Chen ......................... | G06T 3/40 |
| 2019/0370579 | A1 | 12/2019 | Sugawara et al. | |
| 2020/0148220 | A1* | 5/2020 | Kim ...................... | B60W 40/09 |

(Continued)

FOREIGN PATENT DOCUMENTS

| | | |
|---|---|---|
| JP | H09-198508 A | 7/1997 |
| JP | 2010-097379 A | 4/2010 |
| JP | 2020-086907 A | 6/2020 |

(Continued)

*Primary Examiner* — Jennifer Mehmood
*Assistant Examiner* — Pardis Sohraby
(74) *Attorney, Agent, or Firm* — OLIFF PLC

(57)          ABSTRACT

This paper discloses a careless driving determination apparatus. The careless driving determination apparatus captures a plurality of face images of a driver of a vehicle in a predetermined period using a driver monitor camera. Then, it determines whether each of the plurality of face images shows first status in which the driver wears a wearing object or second status in which the driver does not wear the wearing object, the wearing object covering a part of a face of the driver. Then, it calculates a distribution range of angles of face directions or angles of gaze directions of the driver. Then, it sets a threshold range based on ratio of face images that show the first status and ratio of face images that show the second status. Then, it determines that the driver is in a careless driving state when the distribution range is included in the threshold range.

5 Claims, 7 Drawing Sheets

(56) References Cited

U.S. PATENT DOCUMENTS

2022/0004790 A1* 1/2022 Tomosue ............ G06V 20/597

FOREIGN PATENT DOCUMENTS

JP      2022-012829 A    1/2022
WO      2018/150485 A1   8/2018

* cited by examiner

CARELESS DRIVING DETERMINATION APPARATUS AND CARELESS DRIVING DETERMINATION METHOD

CROSS-REFERENCE TO RELATED APPLICATION

The present application claims priority under 35 U.S.C. § 119 to Japanese Patent Application No. 2022-115844, filed Jul. 20, 2022, the contents of which application are incorporated herein by reference in their entirety.

BACKGROUND

Field

The present disclosure relates to a technique for determining whether a driver is in a careless driving state or not using a driver monitor camera.

Background Art

JP2020-86907A discloses a technique for determining whether a driver of a vehicle is in a careless driving state or not. "Careless driving state" is a state in which the driver drives the vehicle lacking concentration on the driving. When the driver is in the careless driving state, the driver tends to insufficiently check around the vehicle. In this technique, at least one of a face direction and a gaze direction of the driver is acquired. Then, when at least one of the acquired face direction and gaze direction of the driver changes within a predetermined range for predetermined time, it is determined that the driver is in the careless driving state.

SUMMARY

In the technique of JP2020-86907A, the face direction and the gaze direction of the driver are calculated from a face image captured by a driver monitor camera mounted on the vehicle. Therefore, when the driver wears a wearing object covering a part of the driver's face, there is a possibility that a value obtained from the driver monitor camera varies. Examples of such a wearing object include a mask covering the driver's mouth and a pair of glasses cutting infrared radiation shining into the driver's eyes. If the determination about the careless driving is performed without considering a situation relating to the wearing object on the driver's face, there is a possibility that erroneous determination occurs.

The present disclosure is made in view of the above-described problem. An object of the present disclosure is to provide a technique capable of accurately determining whether the driver is in the careless driving state or not by considering the situation relating to the wearing object covering a part of the driver's face.

In order to achieve the above object, the present disclosure is applied to a careless driving determination apparatus for determining whether a driver of a vehicle is in a careless driving state or not. The careless driving determination apparatus comprises a driver monitor camera configured to capture a face image of the driver, a memory configured to store the face image captured by the driver monitor camera, and one or more processors. The one or more processors are configured to:

acquire a plurality of face images captured in a predetermined period;

determine whether each of the plurality of face images shows first status in which the driver wears a wearing object or second status in which the driver does not wear the wearing object, the wearing object covering a part of a face of the driver;

calculate a distribution range of angles of face directions or angles of gaze directions of the driver based on the plurality of face images;

set a first threshold range corresponding to the first status as a threshold range when ratio of face images that show the first status is larger than ratio of face images that show the second status;

set a second threshold range corresponding to the second status as the threshold range when ratio of face images that show the second status is larger than ratio of face images that show the first status; and determine that the driver is in the careless driving state when the distribution range is included in the threshold range.

In the present disclosure, the distribution range may be a range that coordinate points distribute, the coordinate points obtained by projecting the angles of the face directions or the angles of the gaze directions of the driver in the plurality of face images onto a coordinate system defined by a yaw angle and a pitch angle of the vehicle. The threshold range may be a circular range with a predetermined radius and whose center is a center of the distribution range in the coordinate system, and the predetermined radius of the first threshold range may be larger than the predetermined radius of the second threshold range.

In the present disclosure, the processor may be configured to calculate the distribution range using a face image corresponding to the first status out of the plurality of face images when ratio of face images that show the first status is larger than ratio of face images that show the second status among the plurality of face images. The processor may be configured to calculate the distribution range using a face image corresponding to the second status out of the plurality of face images when ratio of face images that show the second status is larger than ratio of face images that show the first status among the plurality of face images.

In the present disclosure, the wearing object may be a mask or a pair of glasses cutting infrared radiation.

Also, in order to achieve the above object, the present disclosure is applied to a careless driving determination method for determining whether a driver of a vehicle is in a careless driving state or not. The careless driving determination method includes:

capturing a plurality of face images of the driver in a predetermined period using a driver monitor camera;

determining whether each of the plurality of face images shows first status in which the driver wears a wearing object or second status in which the driver does not wear the wearing object, the wearing object covering a part of a face of the driver;

calculating a distribution range of angles of face directions or angles of gaze directions of the driver based on the plurality of the face image data;

setting a first threshold range corresponding to the first status as a threshold range when ratio of face images that show the first status is larger than ratio of face images that show the second status;

setting a second threshold range corresponding to the second status as the threshold range when ratio of face images that show the second status is larger than ratio of face images that show the first status; and determining that the driver is in the careless driving state when the distribution range is included in the threshold range.

According to the present disclosure, even when the result of the determination relating to the wearing object about each of the plurality of face images acquired in the predetermined period varies, it is determined whether the driver is in the careless driving state or not using the result of the determination of which the ratio is larger. Therefore, erroneous determination about whether the driver wears the wearing object can be prevented, and it is possible to accurately determine whether the driver is in the careless driving state or not.

DETAILED DESCRIPTION

Hereinafter, embodiments of the present disclosure are described with reference to the accompanying drawings. Hereinafter, in embodiments described below, when a number like a number of a certain thing, quantity, amount, range, or the like of each element is referred to, the idea relating to the present disclosure is not limited to the number referred to, except when it is particularly clarified, or the number is clearly specified in principle. In addition, the structure and the like in the embodiments described below are not necessarily essential to the idea relating to the present disclosure, except when particularly clarified or explicitly specified in principle.

1. Configuration of Careless Driving Determination Apparatus

A careless driving determination apparatus according to the present embodiment is an apparatus for determining whether a driver of a vehicle is in a careless driving state. The vehicle, on which the careless driving determination apparatus according to the present embodiment is mounted, is, for example, an autonomous driving vehicle. In the autonomous driving vehicle, recognition, prediction, determination, and operation conventionally performed by the driver to drive the vehicle are performed by an autonomous driving system.

However, there is a possibility that the autonomous driving system become unable to continue autonomous driving due to various causes depending on traveling environment, a system being out of order, or the like. In such a case, the driver needs to start to normally drive the vehicle immediately. Therefore, even while the autonomous driving is performed, the driver's careless driving needs to be avoided. For this reason, the careless driving determination apparatus according to the present embodiment is provided to determine whether the driver is in the careless driving state during autonomous driving.

Figure 1:
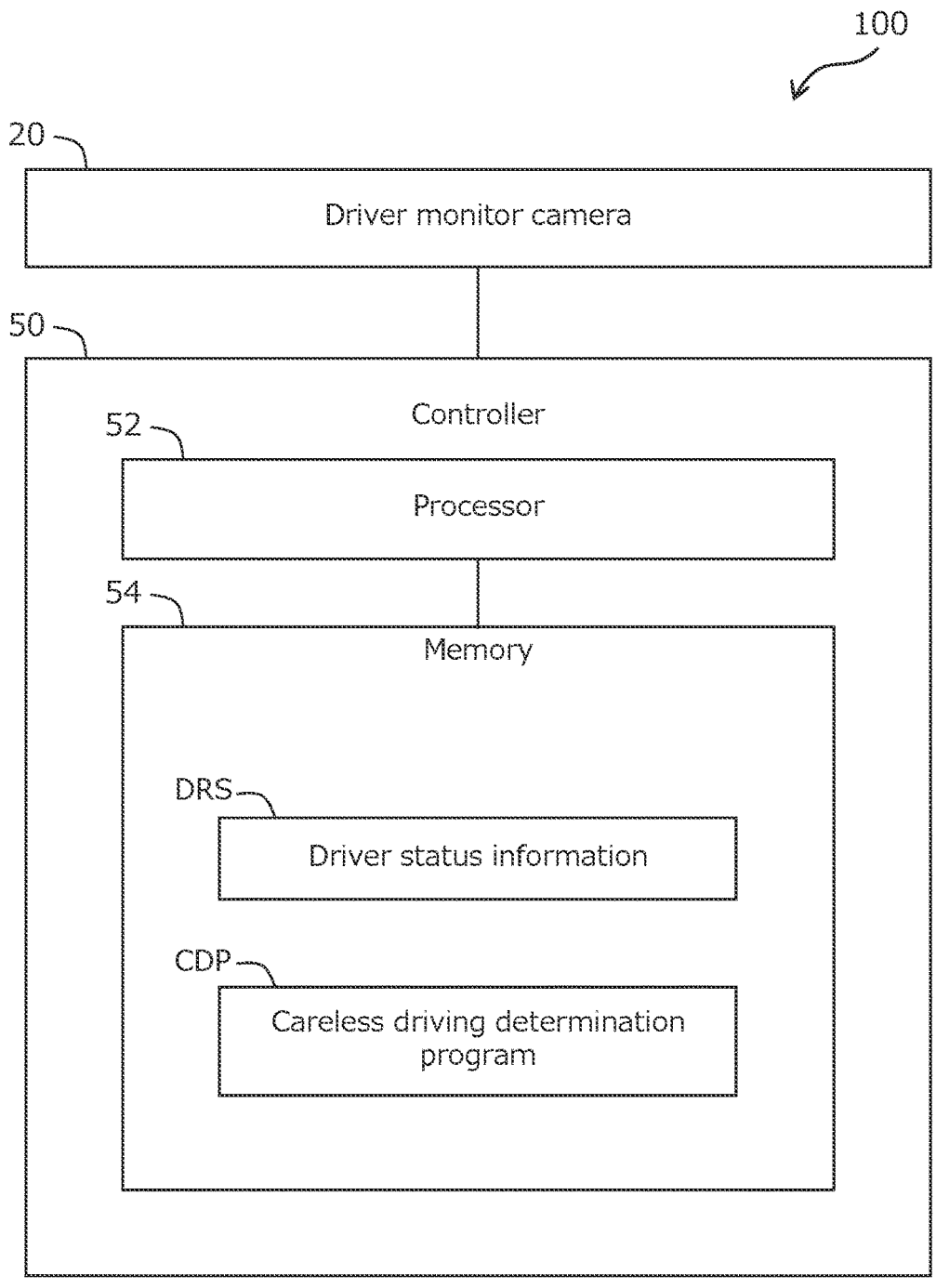
FIG. 1 is a block diagram showing a configuration of a careless driving determination apparatus 100.

The configuration of the careless driving determination apparatus according to the present embodiment is described with reference to FIG. 1. FIG. 1 is a block diagram showing a configuration of a careless driving determination apparatus 100. The careless driving determination apparatus 100 is mounted on the autonomous driving vehicle. The careless driving determination apparatus 100 comprises a driver monitor camera 20 and a controller 50. The controller 50 and the driver monitor camera 20 are connected to each other via an in-vehicle network such as a controller area network (CAN).

The controller 50 is an electronic control unit (ECU) comprising one or more processors 52 (hereinafter simply referred to as the processor 52) and one or more memories 54 (hereinafter simply referred to as the memory 54). The memory 54 stores various programs and data. The memory 54 is not limited to a memory in a narrow sense such as a random access memory (RAM) and may include a data storage device such as a magnetic disk like a hard disk device (HDD), an optical disk like a digital versatile disc (DVD), or a flash memory like a solid state drive (SSD). The data stored in the memory 54 include at least driver status information DRS. The programs stored in the memory 54 include at least a careless driving determination program CDP. The programs stored in the memory 54 are executed by the processor 52.

The driver monitor camera 20 is installed in a position in front of the driver's seat and where it can capture the driver's face. For example, the driver monitor camera 20 is installed in an upper part of a steering column or in the vicinity of an in-vehicle rear view mirror. The driver monitor camera 20 constantly monitors the driver's face and stores the acquired data in the memory 54 of the controller 50. The data acquired by the driver monitor camera 20 including a face image of the driver is stored in the memory 54 as the driver status information DRS. The driver status information DRS is used for determination about careless driving by the processor 52 executing the careless driving determination program CDP as described below. That is, the driver monitor camera 20 functions as the careless driving determination apparatus together with the controller 50.

2. Careless Driving Determination Process

The determination of careless driving by the careless driving determination apparatus 100 is realized by the processor 52 executing the careless driving determination program CDP. It is described how it is determined whether the driver is in the careless driving state by the processor 52 with reference to FIG. 2.

Figure 2:
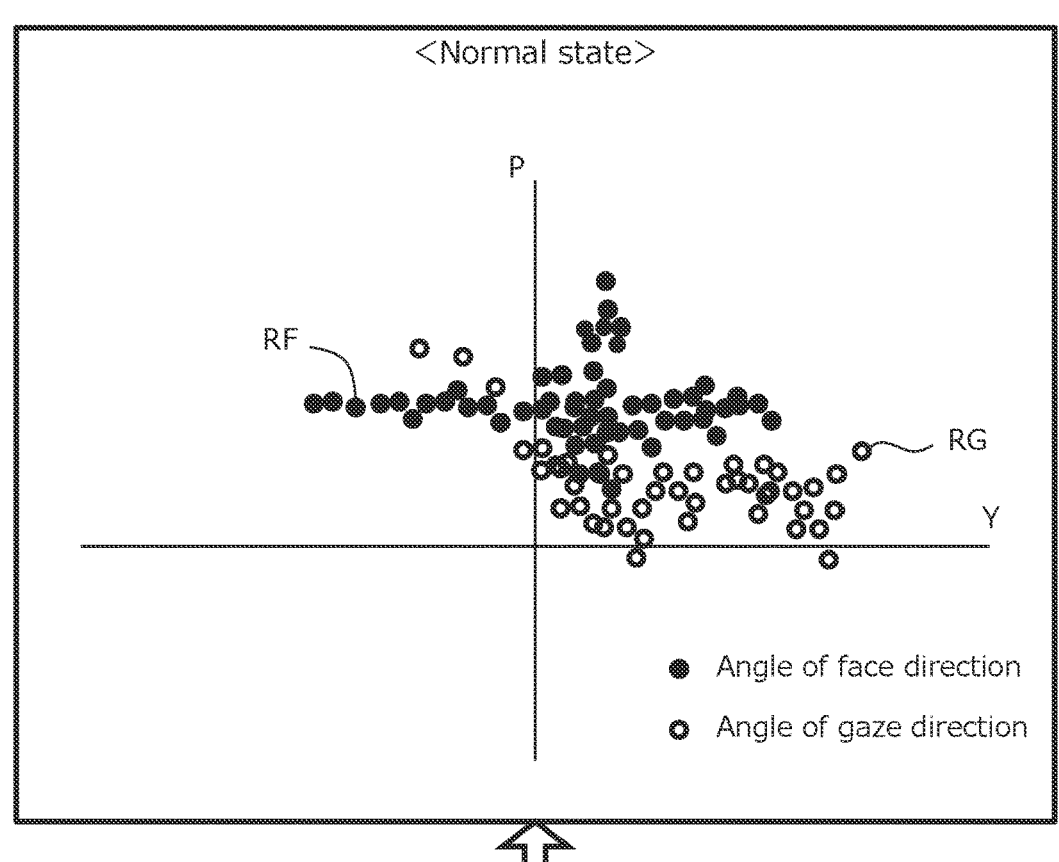
FIG. 2 is a distribution chart showing where a driver's face direction and gaze direction have moved during a certain period.
Figure 2:
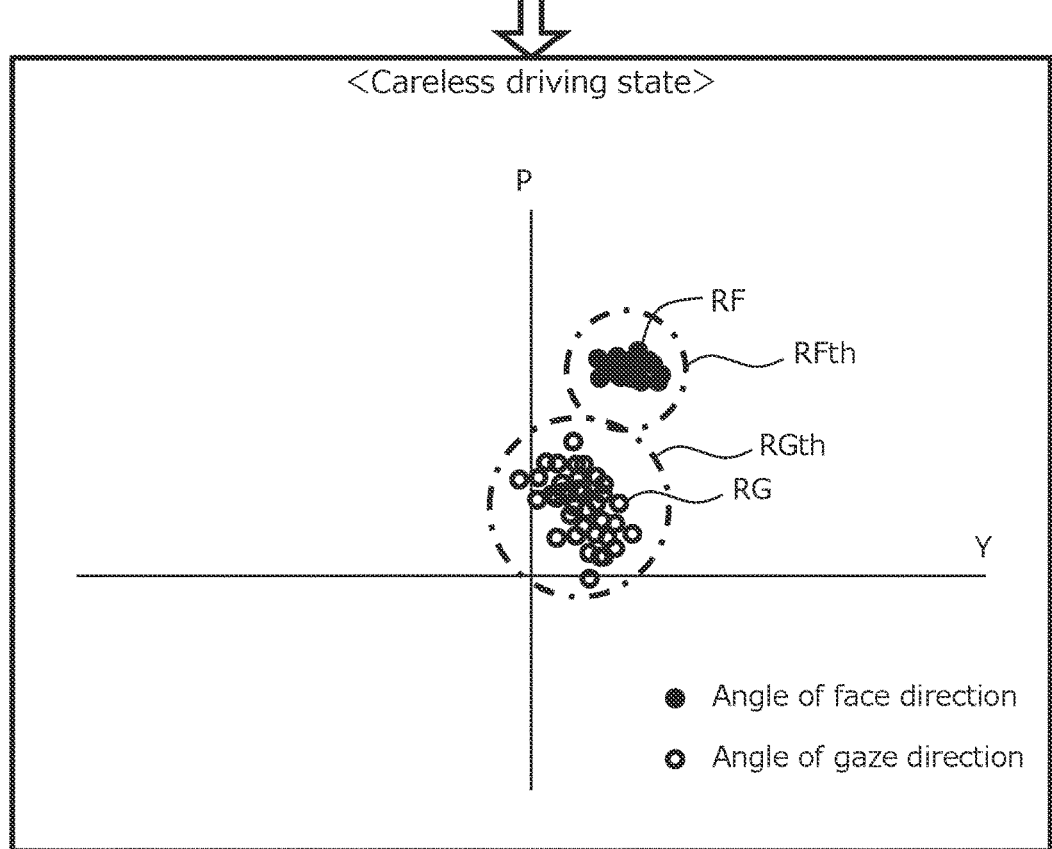

FIG. 2 shows two distribution charts showing where the driver's face direction and gaze direction have moved in a certain period. The upper distribution chart is generated from data acquired when the driver is in a normal state, and the lower distribution chart is generated from data acquired when the driver is in the careless driving state. In each distribution chart, a black circle indicates an angle of the face direction, and a white circle indicates an angle of the gaze direction. In each distribution chart, a vertical axis P indicates a pitch angle of the vehicle, and a horizontal axis Y indicates a yaw angle of the vehicle. An angle corresponding to a direction in which the vehicle is going is set as a zero point to both the axes. Hereinafter, a coordinate system defined by the vertical axis P and the horizontal axis Y is referred to as a "P-Y coordinate system".

As is clear from comparison between the upper and lower distribution charts, when the driver is in the careless driving state, a range in which the angles of face directions are distributed is smaller than when the driver is in the normal state. Therefore, it is considered that it can be determined whether the driver is in the normal state or in the careless driving state by checking the distribution range of the angles of the face directions and the distribution range of the angles of the gaze directions.

The careless driving determination program CDP makes the processor 52 process the driver status information DRS captured by the driver monitor camera 20 and obtain data of the angles of the face directions and the angles of the gaze directions during a predetermined period (for example, 30 seconds). Then, the processor 52 calculates a distribution range RF, in which the angles of the face directions are distributed, and a distribution range RG, in which the angles of the gaze directions are distributed. The distribution range RF and the distribution range RG are rages in which points obtained by projecting the angles of the face directions and the angles of the gaze directions onto the P-Y coordinate system respectively are distributed.

A threshold range RFth is set for the distribution range RF of the angles of the face directions. Likewise, a threshold range RGth is set for the distribution range RG of the angles of the gaze directions. The threshold range RFth and the threshold range RGth are defined as, for example, circular ranges with predetermined radiuses whose centers are centers of the distribution range RF and the distribution range RG on the P-Y coordinate system respectively. The radius of the threshold range RFth and the radius of the threshold range RGth are respectively determined in advance based on the data acquired when the driver is in the careless driving state. The careless driving determination program CDP makes the processor 52 determine that the driver is in the careless driving state when the distribution range RF of the angles of the face directions is equal to or smaller than the threshold range RFth or when the distribution range RG of the angles of the gaze directions is equal to or smaller than the threshold range RGth.

Figure 3:
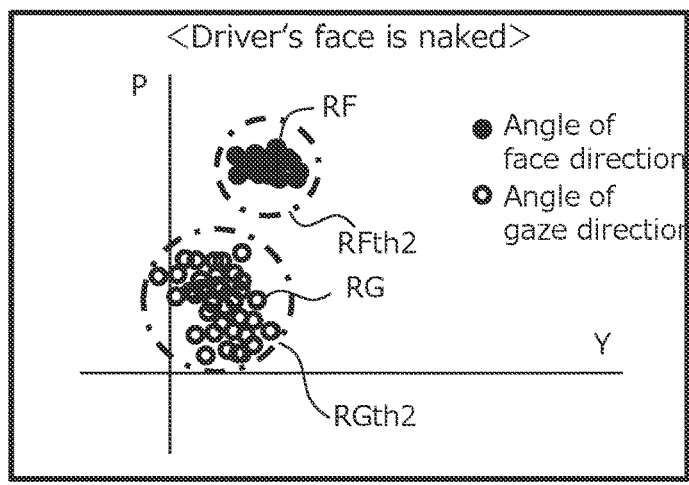
FIG. 3 is a distribution chart showing where a driver's face direction and gaze direction have moved during a certain period when the driver is in a careless driving state.
Figure 3:
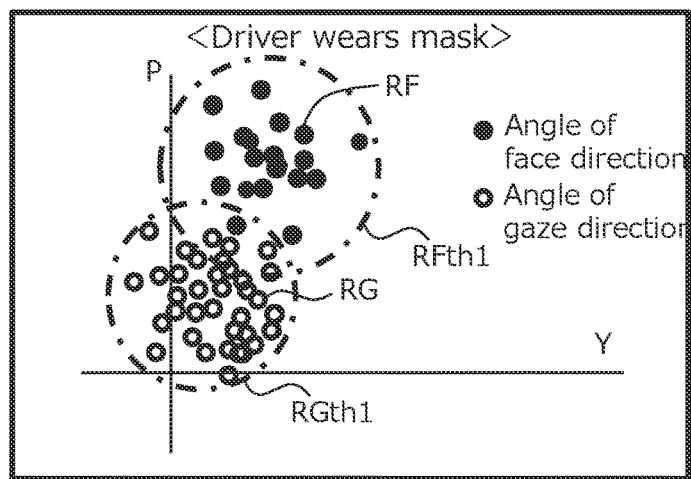
Figure 3:
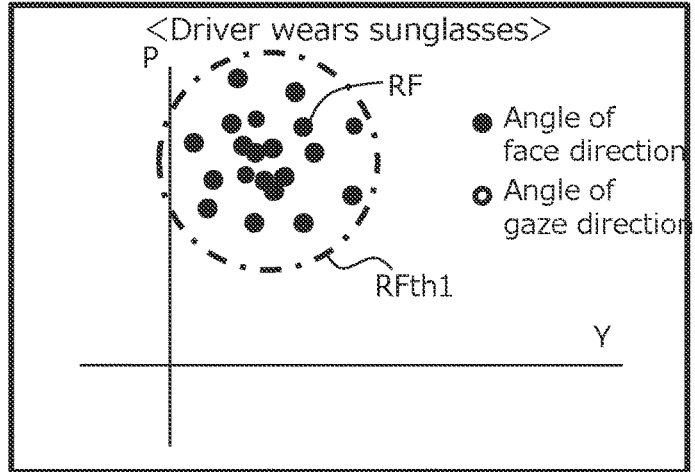

Here, in a case where the driver wears a wearing object on his/her face, there is a possibility that variation occurs with respect to the data of the angles of the face directions or the angles of the gaze directions obtained by processing the driver status information DRS acquired by the driver monitor camera 20. Examples of the wearing object include a mask covering the driver's mouth and a pair of glasses cutting infrared radiation (IR). Hereinafter, the glasses cutting IR are also referred to as "sunglasses". FIG. 3 shows three distribution charts showing where the face direction and the gaze direction of the driver in the careless driving state have moved in a certain period. The upper distribution chart is generated from data showing that the driver's face is naked, the middle distribution chart is generated from data showing that the driver wears the mask, and the lower distribution chart is generated from data showing that the driver wears the sunglasses. In each distribution chart, a black circle indicates the angle of the face direction, and a white circle indicates the angle of the gaze direction.

As is clear from comparison among the distribution charts shown in FIG. 3, the distribution range RF of the angles of the face directions and the distribution range RG of the angles of the gaze directions in a situation where the driver wears the mask have larger variation than those in a situation where the driver's face is naked. Similarly, the distribution range RF of the angles of the face directions in a situation where the driver wears the sunglasses has larger variation than that in a situation where the driver's face is naked. In the situation where the driver wears the sunglasses, the distribution range RG of the angles of the gaze directions is not acquired because the driver monitor camera 20 cannot detect the gaze direction of the driver.

As described above, when the driver wears the mask or the sunglasses, the distribution range RF of the angles of the face directions or the distribution range RG of the angles of the gaze directions, or both tend to vary. Therefore, in the determination relating to the careless driving, if the same threshold range as used in the situation of the naked face is used, there is a possibility that it is determined that the driver is in the normal state even when he/she is in the careless driving state.

Accordingly, the careless driving determination program CDP is configured to make the processor 52 determine whether the driver is in a first status or in a second status and set respective threshold ranges according to the result of the determination. The first status is a status in which the driver wears the wearing object such as the mask or the sunglasses on his/her face. The second status is a status in which the driver does not wear the wearing object on his/her face. More specifically, the processor 52 determines whether the driver wears the mask or not and whether the driver wears the sunglasses or not based on the driver status information DRS. This process is hereinafter referred to as a "wearing object determination process". In the wearing object determination process, the processor 52 acquires a plurality of face images DT of the driver in a predetermined period (for example, 30 seconds). Then, the processor 52 calculates ratio R1 of face images DT1, which show the first status, and ratio R2 of face images DT2, which show the second status, out of the acquired face images DT. The processor 52 determines that the driver wears the wearing object when the ratio R1 is larger than the ratio R2. On the other hand, the processor 52 determines that the driver does not wear the wearing object when the ratio R1 of face images which show the first status (with wearing object) is smaller than the ratio R2 of face images which show the second status (without wearing object).

The careless driving determination program CDP makes the processor 52 set the threshold range according to the result of the determination in the wearing object determination process. Specifically, the processor 52 sets a first threshold range RFth1 as the threshold range RFth and a first threshold range RGth1 as the threshold range RGth when determining that the driver is in the first status. The processor 52 sets a second threshold range RFth2 as the threshold range RFth and a second threshold range RGth2 as the threshold range RGth when determining that the driver is in the second status. In the case where the threshold rages are the circular ranges, the radius of the first threshold range RFth1 and the radius of the first threshold range RGth1 are larger than the radius of the second threshold range RFth2 and he radius of the second threshold range RGth2 respectively.

According to such processing, it is possible to accurately determine whether the driver is in the careless driving state regardless of whether the driver wears the wearing object covering a part of the driver's face. Further, in the wearing object determination process, since it is determined whether the driver wears the wearing object on the basis of the ratio of face images showing that the driver wears the wearing object and the ratio of face images showing that the driver does not wear the wearing object, it is possible to appropriately determine whether the driver wears the wearing object even if there is variation in data about whether the driver wears the wearing object acquired in the predetermined period. Thus, it is possible to prevent erroneous determination of whether the driver wears the wearing object.

3. Specific Processing of Determination of Careless Driving by Careless Driving Determination Apparatus 100

Figure 4:
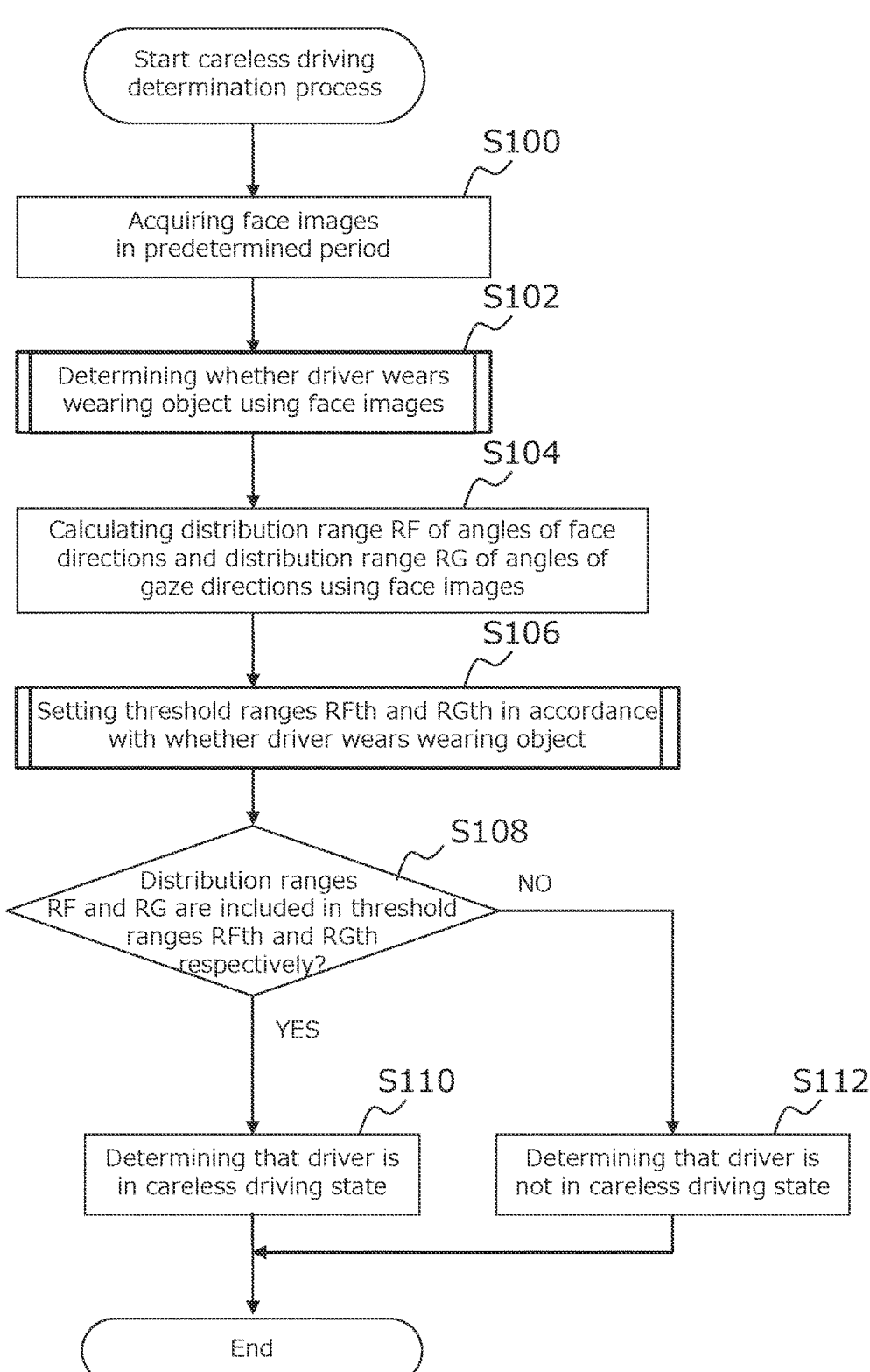
FIG. 4 is a flowchart showing a routine of a careless driving determination process executed by a careless driving determination apparatus 100 according to the embodiment.

Next, a specific processing of determination of careless driving by the careless driving determination apparatus 100 is described. FIG. 4 is a flowchart showing a routine of a careless driving determination process executed by the careless driving determination apparatus 100 of the present embodiment. The routine shown in FIG. 4 is started by the processor 52 executing the careless driving determination program CDP.

In Step S100, the face images of the driver are acquired during the predetermined period (for example, 30 seconds). Face images captured by the driver monitor camera 20 are constantly stored in the memory 54 as the driver status information DRS. In Step S100, face images of the driver for the predetermined period are acquired from the driver status information DRS.

Figure 5:
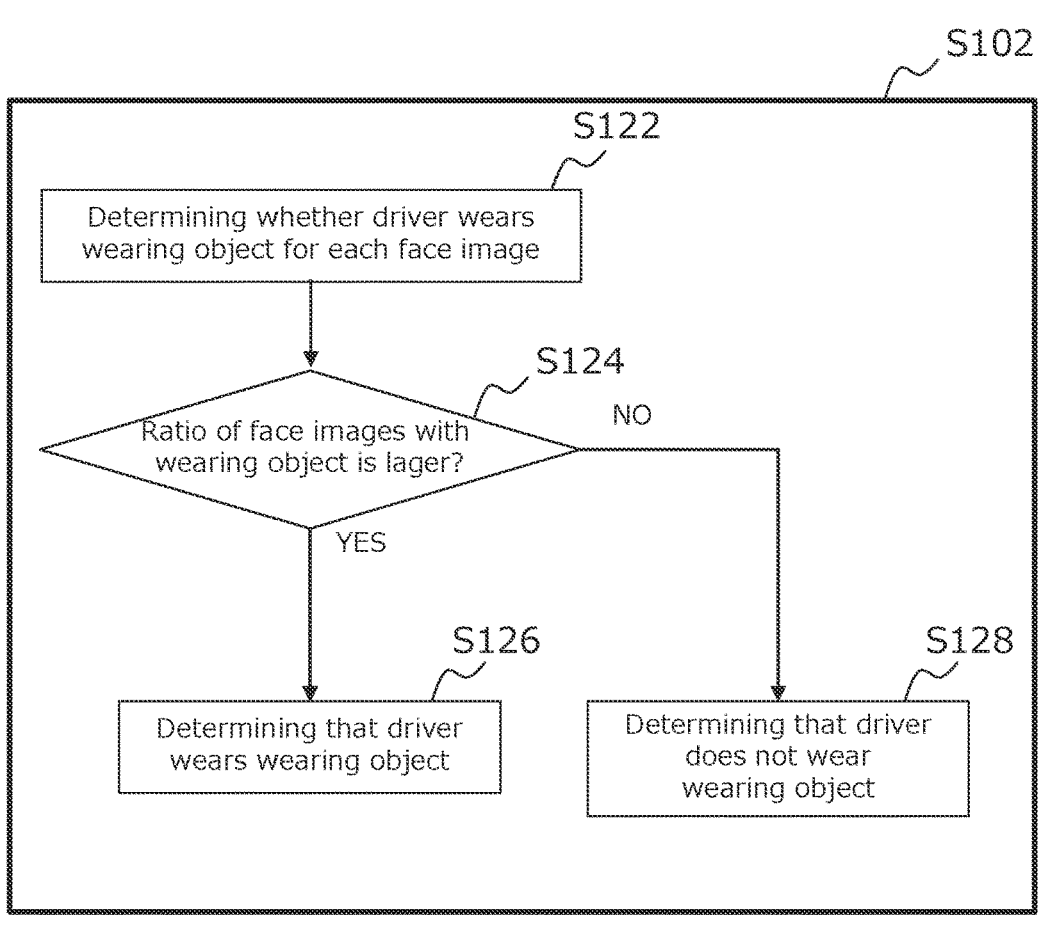
FIG. 5 is a flowchart showing a flow of a wearing object determination process executed in Step S102 of FIG. 4.

In Step S102, it is determined whether the driver wears the wearing object on the face or not using the face images acquired in Step S100. FIG. 5 is a flowchart showing a flow of the wearing object determination process executed in Step S102 of FIG. 4. In Step S122 of FIG. 5, it is determined whether the driver wears the wearing object using known image recognition technique for each of the face images acquired in Step S100.

In Step S124, it is determined whether the ratio R1 of the face images DT1 showing the first status, in which the driver wears the wearing object, is larger than the ratio R2 of the face images DT2 showing the second status, in which the driver does not wear the wearing object, or not. As a result of the determination, when the ratio R1 is larger than the ratio R2, the processing proceeds to Step S126, and it is determined that the driver wears the wearing object. On the other hand, when the ratio R1 is not larger than the ratio R2, the processing proceeds to Step S128, and it is determined that the driver does not wear the wearing object.

After the process of Step S102 is executed, the processing proceeds to the next Step S104. In Step S104, the distribution range RF of the angles of the face directions and the distribution range RG of the angles of the gaze directions in the P-Y coordinate system are calculated from the face images acquired in Step S100. After the process of Step S104 is executed, the processing proceeds to the next Step S106.

Figure 6:
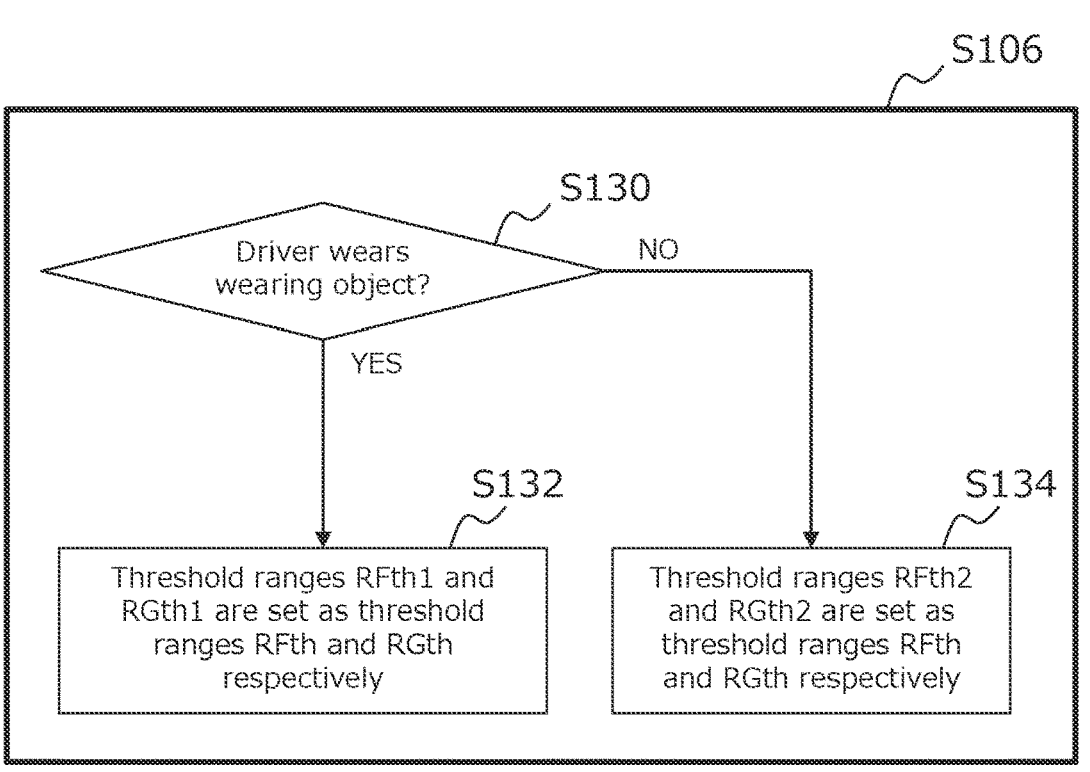
FIG. 6 is a flowchart showing a flow of a setting process of a threshold range executed in Step S106 of FIG. 4.

In Step S106, the threshold ranges RFth and RGth are set for determining whether the driver is in the careless driving state. FIG. 6 is a flowchart showing a flow of processing executed in Step S106 of FIG. 4 for setting the threshold range. In Step S130 of FIG. 6, it is determined whether it has been determined that the driver wears the wearing object in the wearing object determination process of Step S102 or not. As a result of the determination, if it has been determined that the driver wears the wearing object, the processing proceeds to Step S132.

In Step S132, the first threshold ranges RFth1 and RGth1 are calculated. Here, the circular range having a first radius RFr1 and whose center is a center of the distribution range RF and the circular range having a first radius RGr1 and whose center is a center of the distribution range RG are calculated as the first threshold ranges RFth1 and RGth1 respectively. The distribution ranges RF and RG have been calculated in Step S104. Respective first radiuses RFr1 and RGr1 are set in advance based on past face images to calculate the threshold ranges for determining whether the driver with the wearing object is in the careless driving state. Then, the calculated first threshold ranges RFth1 and RGth1 are set as the threshold ranges RFth and RGth respectively for determining whether the driver is in the careless driving state.

On the other hand, if it has not been determined that the driver wears the wearing object, the processing proceeds to Step S134. In Step S134, the second threshold ranges RFth2 and RGth2 are calculated. Here, the circular range having a second radius RFr2 and whose center is a center of the distribution range RF and the circular range having a second radius RGr2 and whose center is a center of the distribution range RG are calculated as the second threshold ranges RFth2 and RGth2 respectively. The distribution ranges RF and RG have been calculated in Step S104. Respective second radiuses RFr2 and RGr2 are set in advance based on past face images to calculate the threshold ranges for determining whether the driver without the wearing object is in the careless driving state. The second radius RFr2 is smaller than the first radius RFr1, and the second radius RGr2 is smaller than the first radius RGr1. That is, the second threshold range RFth2 is smaller than the first threshold range RFth1, and the second threshold range RGth2 is smaller than the first threshold range RGth1. Then, the calculated second threshold ranges RFth2 and RGth2 are set as the threshold ranges RFth and RGth respectively for determining whether the driver is in the careless driving state.

After the process of Step S106 is executed, the processing proceeds to the next Step S108. In Step S108, it is determined whether the distribution ranges RF and RG, which have been obtained in Step S104, are included in the threshold ranges RFth and RGth, which have been set in Step S106, respectively. As a result of the determination, if the respective distribution ranges are included in the threshold ranges, the processing proceeds to Step S110, and it is determined that the driver is in the careless driving state. On the other hand, if the respective distribution ranges are not included in the threshold ranges, the processing proceeds to Step S112, and it is determined that the driver is not in the careless driving state.

As is clear from the above description, according to the careless driving determination apparatus 100 of the present embodiment, it is possible to accurately determine whether the driver wears the wearing object on his/her face. Therefore, it is possible to determine whether the driver is in the careless driving state with high accuracy.

4. Modified Example

The careless driving determination apparatus 100 according to the present embodiment may execute modified processes as follows.

4-1. Careless Driving Determination Process

To determine whether the driver is in the careless driving state, the processor 52 may use only one of the distribution range RF of the angles of the face directions and the distribution range RG of the angles of the gaze directions.

4-2. Wearing Object Determination Process

In the wearing object determination process, the processor 52 may determine whether the driver wears the mask and determine whether the driver wears the sunglasses respectively. In this case, in Step S132, the processor 52 may set different threshold ranges RFth and RGth when the driver wears the mask and when the driver wears the sunglasses.

4-3. Threshold Ranges RFth and RGth

The threshold ranges RFth and RGth are not limited to the circular ranges. The threshold range RFth or the threshold range RGth, or both may be a range having other shape which is set based on the past face images.

4-4. Distribution Ranges RF and RG

The distribution ranges RF and RG used in the careless driving determination process may be set according to whether the driver wears the wearing object. That is, when it is determined that the driver wears the wearing object in the wearing object determination process, it is not preferable that the face images DT2 showing that the driver does not wear the wearing object are used for determining whether the driver is in the careless driving state. Similarly, when it is determined that the driver does not wear the wearing object in the wearing object determination process, it is not preferable to use the face images DT1 showing that the driver wears the wearing object for determining whether the driver is in the careless driving state. Therefore, when determining that the driver wears the wearing object in the wearing object determination process, the processor 52 sets the distribution ranges RF and RG used in the careless driving determination process based on the face images DT1, which show that the driver wears the wearing object. Similarly, when determining that the driver does not wear the wearing object in the wearing object determination process, the processor 52 sets the distribution ranges RF and RG used in the careless driving determination process based on the face images DT2, which shows that the driver does not wear the wearing object.

Figure 7:
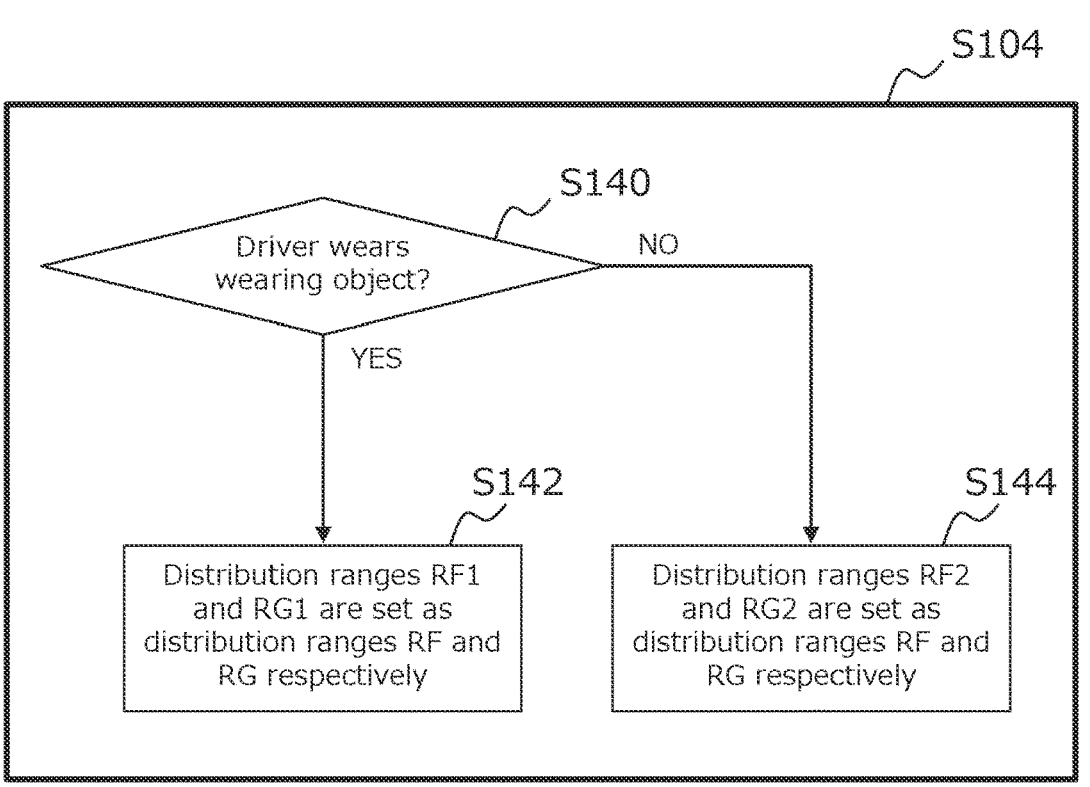
FIG. 7 is a flowchart showing a modification of a process executed in Step S104 of FIG. 4.

These modified processes can be realized, for example, by the processor 52 executing the processing shown in FIG. 7 in Step S104 in the careless driving determination process shown in FIG. 4. FIG. 7 is a flowchart showing a modified example of the process executed in Step S104 of FIG. 4. In Step S140 of FIG. 7, the processor 52 determines whether it has been determined that the driver wears the wearing object in the wearing object determination process of Step S102 or not. As a result of the determination, when it has been determined that the driver wears the wearing object, the processing proceeds to Step S142. On the other hand, when it has been determined that the driver does not wear the wearing object, the processing proceeds to Step S144.

In Step S142, the distribution ranges RF1 and RG1 calculated using only the face images DT1, which shows that the driver wears the wearing object, are set as the distribution ranges RF and RG respectively. On the other hand, in Step S144, the distribution ranges RF2 and RG2 calculated using only the face images DT2, which shows that the driver does not wear the wearing object, are set as the distribution ranges RF and RG respectively. As a result, the distribution ranges RF and RG reflecting whether the driver wears the wearing object or not are set.

What is claimed is:

1. A careless driving determination apparatus mounted on a vehicle, the careless driving determination apparatus comprising:

a driver monitor camera installed in the vehicle in front of a seat of a driver of the vehicle and configured to capture a face image of a face of the driver of the vehicle;

a memory configured to store the face image captured by the driver monitor camera during a predetermined time period; and one or more processors configured to:

acquire a plurality of the face images captured during the predetermined time period;

execute an image-recognition process to determine, for each of the face images captured during the predetermined time period, whether the face image shows a first status in which the driver wears a wearing object that interferes with face or gaze detection or a second status in which the driver does not wear the wearing object, the wearing object covering a part of the face of the driver;

calculate, based on the plurality of face images, a distribution range of angles of face directions or angles of gaze directions of the driver onto a yaw-pitch coordinate system set relative to a body of the vehicle;

set a threshold range (i) to a first range when a majority of the face image captured during the predetermined time period have the first status indicating that the driver wears the wearing object, and (ii) to a second range that is smaller than the first range when a majority of the face images captured during the predetermined time period have the second status indicating that the driver does not wear the wearing object; and determine that the driver is in a careless driving state when the distribution range is equal to or less than the threshold range.

2. The careless driving determination apparatus according to claim 1, wherein:

the threshold range is a circular range with a predetermined radius and whose center is a center of the distribution range in the yaw-pitch coordinate system; and the predetermined radius of the first range is larger than the predetermined radius of the second range.

3. The careless driving determination apparatus according to claim 1, wherein the one or more processors are configured to:

calculate the distribution range using a face image corresponding to the first status out of the plurality of face images when the majority of the face images have the first status; and calculate the distribution range using a face image corresponding to the second status out of the plurality of face images when the majority of the face images have the second status.

4. The careless driving determination apparatus according to claim 1, wherein the wearing object is a mask or a pair of glasses cutting infrared radiation.

5. A careless driving determination method comprising:

capturing a plurality of face images of a face of a driver of a vehicle in a predetermined time period using a driver monitor camera installed in the vehicle in front of a seat of the driver of the vehicle;

determining, by one or more processors executing an image-recognition process, for each of the face images captured during the predetermined time period, whether the face image shows a first status in which the driver wears a wearing object that interferes with face or gaze detection or a second status in which the driver does not wear the wearing object, the wearing object covering a part of the face of the driver;

calculating, by the one or more processors, based on the plurality of face images, a distribution range of angles of face directions or angles of gaze directions of the driver onto a yaw-pitch coordinate system set relative to a body of the vehicle;

setting, by the one or more processors, a threshold range (i) to a first range when a majority of the face images captured during the predetermined time period have the first status indicating that the driver wears the wearing object, and (ii) to a second range that is smaller than the first range when a majority of the face images captured during the predetermined time period have the second status indicating that the driver does not wear the wearing object; and determining, by the one or more processors, that the driver is in the careless driving state when the distribution range is equal to or less than the threshold range.

* * * * *